Patented Sept. 26, 1950

2,523,743

UNITED STATES PATENT OFFICE 2,523,743

PROCESS FOR PRODUCING 4-ACETAMIDO-4,4-DICARBALKOXY-1-BUTANOLS

Donald T. Warner and Owen A. Moe, Minneapolis, Minn., assignors to General Mills, Inc., a corporation of Delaware No Drawing. Application December 6, 1946, Serial No. 714,646

1 Claim. (Cl. 260—482)

The present invention relates to the preparation of various intermediate carbinol compounds which are useful in the synthesis of amino acids and in other organic syntheses. The carbinol compounds contemplated by the present invention may be illustrated by the following formula:

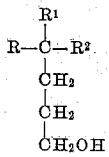

in which R and $R^1$ may be alike or different and selected from the following groups: carboxyl, carboxylic acid ester, carbonamide (—$CONH_2$, —$CONHR$, etc.) or nitrile; $R^2$ is a substituted amino group in which at least one hydrogen has been replaced by a group which can be easily removed, such as an acyl, or sulfonyl, and the like. Suitable substituted amino groups include phthalimido; N acyl, such as $NOCCH_3$, $NOCC_6H_5$, etc.; N sulfonyl, such as $NSO_2C_6H_5$; N carbobenzoxy, such as $NCOOCH_2C_6H_5$; and the like. It will be apparent that $R^2$ may be mono-substituted or may be di-substituted by any group or combination of groups of the above type.

The esterifying group of the carboxylic acid ester referred to in the above formula may vary widely, and may include alkyl, aryl, aralkyl, alkyaryl, and other groups. Examples of these groups are methyl, ethyl, propyl, phenyl, benzyl, toluyl, and the like. Of these, the low alkyl groups are preferred. Similar variations are possible in the carbonamide groups.

It is, therefore, an object of the present invention to provide novel carbinol compounds of the above type, which are particularly useful in the synthesis of amino acids.

It is a further object of the present invention to provide a novel process of producing these compounds.

The carbinols of the present invention may be prepared by the reduction of the corresponding aldehyde. These aldehydes and their preparation are disclosed in our copending application, Serial No. 648,020, filed February 15, 1946, now abandoned, entitled Aldehydo Compounds and Processes of Producing the Same. According to that application, these aldehydes may be prepared by any of a number of reactions. One suitable method of preparing them involves the addition of a suitable malonate to acrolein. For example, by adding acetamido malonic ester to acrolein, it is possible to get gamma, gamma-dicarbethoxy-gamma-acetamidobutyraldehyde.

The reduction of the aldehyde to the carbinol may be accomplished by means of hydrogenation, for example, at a pressure of 1,000–2,000 pounds per square inch at a temperature of 60–150° C. in a suitable organic solvent such as ethanol, and in the presence of a catalyst such as Raney nickel. The catalyst may then be removed by filtration and the solvent by distillation in vacuo to yield a syrupy mass. After the solvent has been removed under vacuum, ether may be added to the viscous residue to produce the immediate formation of the crystalline product. This crystalline product is 4,acetamido-4,4-dicarbethoxy-1-butanol, and melts at 80–81° C. A further quantity of the carbinol can be obtained from the mother liquor by further treatment with ether and evaporation in vacuo.

The above mentioned carbinol may be converted to a diamido compound by reacting it with concentrated aqueous ammonium hydroxide solution (saturated with ammonia at 0° C.) The resultant product melts at 170–171° C. For purposes of characterization, the 4,acetamido-4,4-dicarbethoxy-1-butanol and the 4,acetamido-4,4-diamido-1-butanol may be converted to the 3,5-dinitrobenzoates, and to the p-nitrobenzoates. The 3,5-dinitrobenzoate of the 4,acetamido-4,4-dicarbethoxy-1-butanol has a melting point of 151–152° C., while its p-nitrobenzoate melts at 79–80° C. The 3,5-dinitrobenzoate of the 4,acetamido-4,4-diamido-1-butanol melts at 201–202° C. with decomposition, while its p-nitrobenzoate melts at 242–243° C. with decomposition.

To produce carbinol compounds in which R and/or $R^1$ are nitrile, the reduction may be conducted while R and/or $R^1$ are carboxyl, carboxylic acid ester, or carbonamide, and then convert these groups to nitriles. If the nitrile group were present during the reduction, it would be converted to an amino group.

EXAMPLE

A. *Preparation of 4-acetamido-4,4-dicarbethoxy-1-butanol*

(a) PREPARATION OF GAMMA-ACETAMIDO-GAMMA, GAMMA-DICARBETHOXY BUTYRALDEHYDE

Metallic sodium (0.15 gm.) was added to 300 cc. of absolute ethanol. When complete solution was attained, 130.2 gm. of ethyl acetamidomalonate were added and the mixture was cooled to 2° C. in an ice-salt bath. To this cooled slurry, 36.4 g. of acrolein (containing 1% hydroquinone) were added over an 80-minute period at such a rate that the temperature of the reaction mixture did not exceed 5° C. The resulting clear, yellow liquid was stirred for an additional three hours at 2° C. and allowed to stand for another hour at this temperature. The catalyst was neutralized by the addition of 0.53 g. of glacial acetic acid dissolved in approximately 5 cc. of absolute ethanol. The final reaction mixture was definitely acidic. The total volume of the reaction mixture was approximately 430 cc.

(b) PREPARATION OF 4-ACETAMIDO-4,4-DICARBETHOXY-1-BUTANOL BY THE CATALYTIC REDUCTION OF GAMMA-ACETAMIDO-GAMMA,GAMMA-DICARBETHOXY BUTYRALDEHYDE

A portion of the above reaction mixture (143 cc.) was evaporated to a thin syrup in vacuo. This syrup was dissolved in absolute ethanol and sufficient ethanol was added to make a total volume of 300 cc. Then 4.2 g. of Raney nickel catalyst were added and the mixture was hydrogenated at 1600–1700 lbs. initial pressure at a temperature of 120–146° C. for a period of three hours. The catalyst was removed by filtration, and the clear filtrate was concentrated in vacuo to a thin syrup. Benzene was added, and the solution was again concentrated in vacuo. This addition of benzene and removal under vacuum, was repeated. Finally 35 cc. of ether was added and the mixture was warmed slightly until it became perfectly homogeneous. When the resulting reaction mixture was cooled, long, needle-like crystals were obtained. This crystalline product melted at 79–80.5° C. A portion of this crystalline product was further purified by crystallization from ether to yield granular crystals having a melting point of 80–81° C. Additional quantities of 4-acetamido-4,4-dicarbethoxy-1-butanol could be recovered from the filtrate. This second crop of product was collected, and found to have a melting point of 75–77° C. The 4-acetamido-4,4-dicarbethoxy-1-butanol was characterized as the 3,5-dinitrobenzoate. The 3,5-dinitrobenzoate was prepared in the usual manner from 3,5-dinitrobenzoyl chloride. After purification by crystallization from aqueous ethanol, the 3,5-dinitrobenzoate melted at 151–152° C. The above substituted carbinol was also characterized as the p-nitrobenzoate which was prepared in the usual manner. After purification by crystallization from aqueous ethanol, the p-nitrobenzoate melted at 79–80° C.

(c) THE PREPARATION OF 4-ACETAMIDO-4,4-DIAMIDO-1-BUTANOL

Three grams of the crude 4-acetamido-4,4-dicarbethoxy-1-butanol (melting point—75–77° C.) were dissolved in 14 gms. of a concentrated aqueous ammonium hydroxide solution (saturated with ammonia at 0° C.) The above reaction mixture was allowed to stand at room temperature for a period of nineteen hours in a tightly stoppered flask. The reaction mixture was then filtered and concentrated in vacuo. The resulting viscous amber colored oil was dissolved in 30 cc. of absolute ethanol by cautious warming. When the ethanol solution was cooled the formation of a copious precipitate was noted. The precipitated product was collected by filtration, and this material melted at 168–172° C. When the diamido carbinol was purified by crystallization from absolute ethanol it melted at 170–171° C. The 4-acetamido-4,4-diamido-1-butanol was characterized as the 3,5-dinitrobenzoate in the usual manner. The 3,5-dinitrobenzoate was purified by crystallization from aqueous ethanol and it melted at 201–292° C. with decomposition. The above diamido carbinol was also characterized as the p-nitrobenzoate in the usual manner. After purification by crystallization from aqueous ethanol the p-nitrobenzoate melted at 242–243° C. with decomposition.

These compounds are particularly adapted for the synthesis of proline. Proline may be prepared from this carbinol by the following series of reactions: The carbinol may be converted to the chloride by reaction, for example, with thionyl chloride. Thereafter, the chloro compound may be hydrolyzed, decarboxylated, and cyclicized, to yield proline.

We claim as our invention:

Process of producing carbinols having the following structural formula:

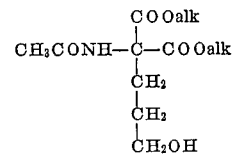

in which alk represents a low alkyl group, which comprises catalytically reducing the corresponding aldehyde at a pressure within the approximate range of 1000–2000 pounds per square inch at a temperature within the approximate range of 60–150° C.

DONALD T. WARNER.
OWEN A. MOE.

REFERENCES CITED

The following references are of record in the file of this patent:

Dakin: "Jour. Biol. Chem.," vol. 154 (1944), pp. 552–555.

Fieser et al.: "Organ. Chem." (D. C. Heath, 1944), pp. 117–118, 211–214.